United States Patent [19]

Baker

[11] Patent Number: 4,792,546

[45] Date of Patent: Dec. 20, 1988

[54] METHOD FOR INCREASING WEIGHT GAINS AND REDUCING DEPOSITION OF FAT IN ANIMALS

[75] Inventor: Pamela K. Baker, Princeton, N.J.

[73] Assignee: American Cyanamid Company, Stamford, Conn.

[21] Appl. No.: 938,292

[22] Filed: Dec. 5, 1986

[51] Int. Cl.$^4$ .............................................. A61K 37/36
[52] U.S. Cl. ...................................... 514/12; 530/399
[58] Field of Search ................. 514/523, 524, 12, 9, 514/376; 530/399, 402; 558/422

[56] References Cited

U.S. PATENT DOCUMENTS

| 3,664,925 | 5/1972 | Sonenberg et al. | 530/399 |
|---|---|---|---|
| 4,404,222 | 9/1983 | Baker et al. | 514/523 |
| 4,407,819 | 10/1983 | Kiernan et al. | 514/524 |
| 4,522,822 | 6/1985 | Kiernan | 514/376 |
| 4,670,249 | 6/1987 | Ivy et al. | 514/9 |

OTHER PUBLICATIONS

Chem. Abstracts, vol. 102, 1985, 94634j.
Endocrinology, vol. 30, 1942, pp. 1–10.

*Primary Examiner*—Delbert Phillips
*Assistant Examiner*—T. D. Wessendorf
*Attorney, Agent, or Firm*—Alice C. Brennan

[57] ABSTRACT

The invention is a novel method comprising administering growth hormones parenterally and substituted phenylethane derivatives orally or parenterally to meat producing animals to obtain increased weight gains and anti-lipogenic activity in the animals.

4 Claims, No Drawings

METHOD FOR INCREASING WEIGHT GAINS AND REDUCING DEPOSITION OF FAT IN ANIMALS

BACKGROUND OF THE INVENTION

Certain 1-(aminodihalophenyl)-2-aminoethanols, substitution products thereof and acid addition salts thereof are disclosed in U.S. Pat. No. 3,536,712. Specifically, this patent discloses methods for preparation of the compounds and for their use for enhancing blood circulation, as bronchodilators, analgesics, sedatives, antipyretics and the like in warm-blooded animals. U.S. Pat. No. 4,407,819 discloses the use of certain 1-(aminodihalophenyl)-2aminoethanols for increasing lean meat, improving lean meat to fat ratio, reduction of body fat and improving the efficiency of feed utilization Other related 1-(aminodihalophenyl)-2-aminoethanols and their derivatives are disclosed in Japanese Kokai. No. 77 83,619 (C.A. 87, 20106lr), German Offenlegungsschrift No. 2,804,625 (1979), German Offenlegungsschrift No. 2,157,040 (1973), German Offenlegungsschrift No. 2,261,914 (1974), European Patent Application No. 8,715 (1980), Netherlands Patent Application No. 7,303,612 (1973). The applications disclose uses selected from analgesics, broncholytic, anti-inflammatory, uterine spasmolytic, B-mimetic and/or B-blocking activities, mobilizing body fat, treating allergies, among others.

Other related phenylethanolamine compounds are described in pending Application for U.S. Pat. No. 714,240 of G. Asato et al filed Mar. 21, 1985 and Offenlegungsschrift No. DE 3,306,159 Al which describes a very broad class of substituted phenylethylamine derivatives which were said to be growth promoters for pigs, cows, poultry, cats, dogs, rabbits, fur animals, fish, and reptiles.

Pending applications for U.S. Pat. Nos. 625,340, filed June 27, 1984 and 564,805, filed Dec. 23, 1983, describe compositions containing phenylethanol compounds and certain tetrahydrobenzothiopene growth promoters and various antibiotics respectively.

It is an object of the invention to provide a method comprising administering formula (I) compounds or acid addition salts thereof with treatments of growth hormones which provides enhanced growth promotion and maintains reduced body fat levels of the treated animals, resulting in the production of larger quantities of lean meat. It is also an object of this invention to provide a method comprising administering formula (I) compounds or acid addition salts thereof to meat-producing animals as animal feed supplement, injectable solutions, implants or a combination of treatments which increases weight gain and at the same time reduces fat deposition and improves the lean meat to fat ratio in farm and domestic animals, such as swine, goats, sheep, cattle, rabbits, and poultry, or any meat-producing animal.

SUMMARY OF THE INVENTION

The invention is a novel method for increasing weight gain and reducing deposition of fat in warm-blooded animals comprising administering as a feed additive or parenteral compositions, biologically active, substituted phenylethane compounds or pharmaceutically acceptable acid addition salts thereof of formula (I),

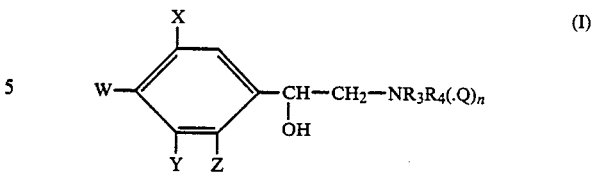

wherein W is H or $NR_1R_2$; $R_1$ is hydrogen or $C_1$–$C_{14}$ alkyl; $R_2$ is hydrogen or methyl, provided that when $R_1$ is $C_2$–$C_{14}$ alkyl, then $R_2$ is hydrogen; $R_3$ and $R_4$ are each hydrogen or $C_1$–$C_6$ alkyl; X is hydrogen, methyl, bromine, chlorine or fluorine provided that X and W are not simultaneously hydrogen; Y is bromine, chlorine, fluorine, cyano or $CF_3$; Z is hydrogen, chlorine or fluorine; Q is an acid that ives pharmaceutically acceptable acid addition salts thereof; preferably Q is hydrochloric, phosphoric, acetic, propionic, citric, gluconic, abietic, oleic, linoleic, linolenic or tall oil fatty acids or mixtures thereof; n is an integer of 0 to 1; Zinterol; Z 1170; QH25B; L-664, 1969; Bitolterol; Reproterol; Pirbuterol; AA497; Formoterol or Colterol and concurrently administering growth hormones parenterally or inducing increases in growth hormone levels.

Surprisingly it has been found that parenteral administration of 0.01 mg/kg/day to 50 mg/kg/day of growth hormones such as bovine growth hormone and porcine growth hormone to animals in conjunction with administering 0.000001% to 0.02%, (0.01 ppm–200 ppm), by weight of a formula I phenylethane derivative, parenterally or in the animals feed, provides weight gains which are in excess of the sum of the weight gains obtained by separate treatment with growth hormones or the formula I phenylethane compounds indicating synergistic weight gains are obtained by this treatment.

Preferred formula (I) phenylethane compounds for use in the method of the invention are those wherein W is H or NHRl, where $R_1$ is hydrogen, $C_1$–$C_4$ alkyl; X is H, F or Cl; Y is F, Cl, $CF_3$ or CN; Z is H or F; $R_3$ and $R_4$ are each H or $C_1$–$C_4$ alkyl. Preferred acid salts of the formula I compounds are the abietic acid, linolenic acid, linoleic acid, oleic acid, acetic acid, tall oil fatty acids, and mixtures thereof. Tee salts are desirable for preparing formulations of the compounds.

A preferred group of compounds for use in the method of this invention includes:

2,5-difluoro-3-[1-hydroxy-2-(isopropylamino)ethyl]benzonitrile;

4-amino-alpha-[(tert-butylamino)methyl]-2,3-difluorobenzyl alcohol;

5-[2-(tert-butylamino)-1-hydroxyethyl]-3,6-difluoroanthranilonitrile;

3-[2-(tert-butylamino)-1-hydroxyethyl]-2,5-difluorobenzonitrile;

3-[2-(tert-butylamino)-1-hydroxyethyl]-5-fluorobenzonitrile;

5-[2-tert-butylamino)-1-hydroxyethyl]-6-fluoroanthranilonitrile;

2-amino-5-[2-(tert-butylamino)-1-hydroxyethyl]-m-tolonitrile;

4-amino-alpha-[(tert-butylamino)methyl]-3,5-difluorobenzyl alcohol;

5-[2-(tert-butylamino)-1-hydroxyethyl]-3-fluoroanthranilonitrile;

5-[1-hydroxy-2-(isopropylamino)ethyl]-N-isopropylanthranilonitrile;

3-fluoro-5-[1-hydroxy-2-(isopropylamino)ethyl]anthranilonitrile;

5-[2-(tert-butylamino)-1-hydroxyethyl]N,N-dipropylanthranilonitrile hydrochloride;

4-amino-alpha-[(tert-butylamino)methyl]-3-fluorobenzyl alcohol;

5-[1-hydroxy-2-(isopropylamino)ethyl]anthranilonitrile and 3,5-dichloro-4-amino-alpha-[(tert-butylamino)methyl]benzyl alcohol.

Additionally, compounds having the structures listed below have utility in the method of this invention.

Zinterol
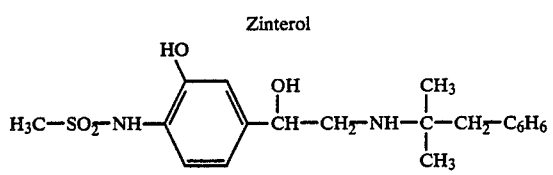

Z 1170
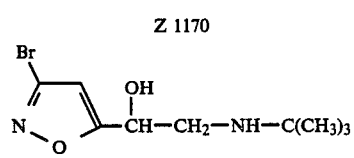

QH25B
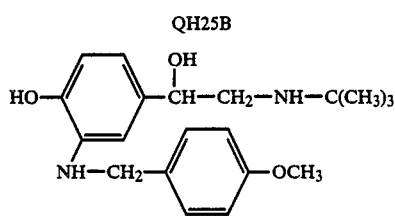

L-644,969
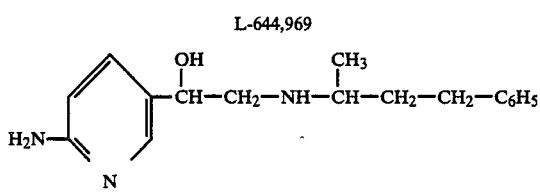

Bitolterol
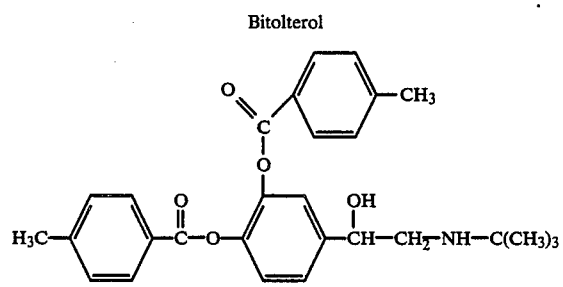

Pirbuterol
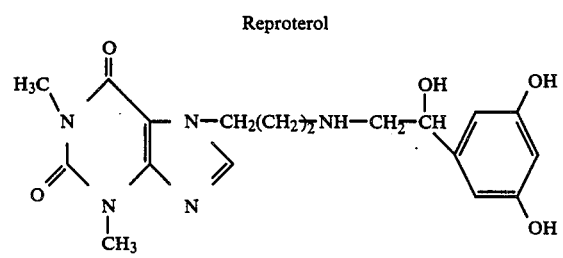

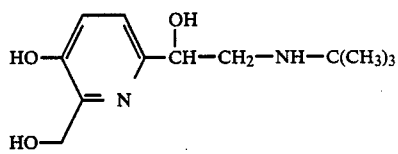

AA497
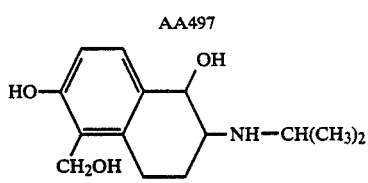

Formoterol
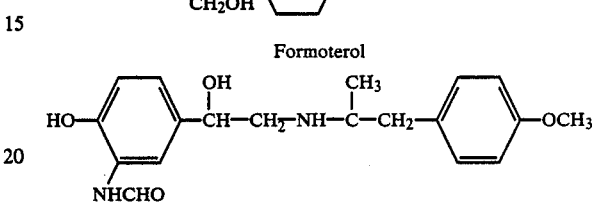

Colterol
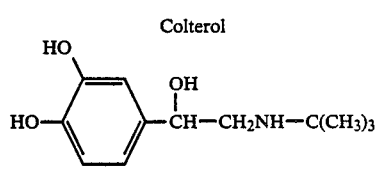

Growth hormones suitable for use in the method of this invention include bovine, ovine, porcine, avian growth hormones as well as somatomedins, growth factors, releasing factors, macromolecules and biologically active fragments which are capable of inducing increases in growth hormone levels in animals.

Advantageously, it has also been found that the increased weight which is gained by animals treated by the method of this invention is not the result of increased fat production. Treatment by the method of the invention results in a significantly larger, lean animal thus increasing the yield of lean meat which may be obtained from it. In a preferred embodiment of the invention an animal feed composition is prepared containing 0.000007% 0.02% (0.01 ppm-200 ppm), by weight, of the phenylethane derivative or the desired acid salt thereof and a daily injection of 0.01 to 50 mg/kg/day of growth hormone is administered to the animal.

In another preferred embodiment, the growth hormone may be administered to the animal in the form of an implant or implants designed to deliver from 0.01 mg/kg/day to 20 mg/kg/day of the hormone and the phenylethane derivative may also be administered daily, by subcutaneous injection or implant, in the form of a pharmaceutically acceptable solution containing from 0.01 mg/kg/day to 50 mg/kg/day preferably 0.1 mg/kg/day to 20 mg/kg/day, of said phenylethane compound.

When the growth hormone is administered to the animals as a parenteral injection or subcutaneous implant, generally sufficient compound is administered to supply about 0.01 mg/kg to 50 mg/kg, and preferably 0.1 mg/kg to 20 mg/kg of body weight per day of the active compound. This treatment will produce the desired improvement in weight gain.

When the phenylethane derivative is administered in the feed, generally about 0.000001% to 0.02% by weight (0.01 ppm-200 ppm) of feed of the phenylethane derivative or acid addition salt thereof is effective for reducing the body fat of the animals receiving the treated feed. Effective dietary levels of the phenylethane derivatives generally vary from animal species to animal species. Useful levels of the phenylethane/amine derivatives administered on a gram per ton of feed basis are: poultry, rabbits, and swine, 0.1 gram/ton to 100 grams/ton, and preferably 0.1 gram/ton to 10 grams/ton of feed; sheep and goats, 0.1 gram/ton to 100 grams/ton, and preferably 0.1 gram/ton to 50 grams/ton of feed; and cattle, 0.1 gram/ton to 100 grams/ton, preferably 0.1 gram/ton to 50 grams/ton of feed.

For parenteral administration, the phenylethane derivative may be prepared in the form of a liquid, paste or pellet and administered as an implant, usually under the skin to the head or earoof the animal.

Parenteral administration generally involves injection of a sufficient amount of the above phenylethane derivative to provide the animal with from 0.00001 mg/kg to 80 mg/kg of body weight of the active ingredient.

The preferred dosage level for cattle is about 0.0001 mg/kg to 50 mg/kg of body weight of the active phenylethane derivative. The preferred dose level of phenylethane derivative for poultry and swine is about 0.0001 mg/kg to 25 mg/kg of animal body weight, and the prefereed dose level of phenylethane derivative for sheep and goats is 0.0001 mg/kg to 50 mg/kg of animal body weight. The preferred dose level for rabbits is 0.0001 mg/kg to 50 mg/kg of animal body weight.

Paste formulations can be prepared by dispersing the active phenllethane derivative in a pharmaceutically acceptable oil such as peanut oil, sesame oil, corn oil, or the like.

Pellets containing an effective level of the phenylethane derivative can be prepared by admixing the active ingredient with a diluent such as carbowax, biodegradable polymers, carnauba wax, or the like. A lubricant, such as magnesium stearate or calcium stearate, may be added to improve the pelleting process if desired.

It is, of course, recognized that more than one pellet may be amministered to an animal to achieve the desired dose level which will provide the increased growth rate and/or impoove efficiency of feed utilization by the animal. Moreover, it has been found that additional implants may also be introduced periodically during the treatment period in order to maintain the proper drug release rate in the animal's body.

The invention is further illustrated by the following non-limiting examples and tables. Results comparable to those in the examples and tables are obtained with other formulations of the invention.

EXAMPLE I

Oleic acid salt of 5-[1-hydroxy-2-(isopropylamino)-ethyl], anthranilonitrile

A warmed solution of oleic acid (3.43 grams; 0.012 mol) in methanol (105 mL) is added to a warmed solution of 5-[1-hydroxy-2-(isopropylamino)-ethyl], anthranilonitrile (2.66 grams; 0.012 mol) in methanol (210 mL). The mixture is stirred for a few minutes at just below the boiling point, and the resulting solution evaporated to dryness to afford the title product as a solid, mp 75°–80° C.

EXAMPLE II

Evaluation of test Compositions—Mouse Study

CF1 female mice, 55 days old, are weighed in groups of 10 and allotted to cages to minimize weight variation among cages. The cages are kept in air-conditioned rooms (22° C. to 24° C.) with automatically controlled lights, 14 hours on and 10 hours off. The basal diet used in these studies is Purina Laboratory Chow (see description below), which is supplied ad libitum. Water is also allowed ad libitum.

The following is a description of the diet to which the compositions of the present invention were added.

DIET

Guaranteed Analysis

Crude protein not less than 23.0%
Crude fat not less than 4.5%
Crude fiber not more than 6.0%
Ash not more than 9.0%

Ingredients

Meat and bone meal, dried skimmed milk, wheat germ meal, fish meal, animal liver meal, dried beet pulp, ground extruded corn, ground oat groats, soybean meal, dehydrated alfalfa meal, cane molasses, animal fat preserved with BHA, vitamin $B_{12}$ supplement, calcium pantothenate, choline chloride, folic acid, riboflavin supplement, brewers' dried yeast, thiamin, niacin, vitamin A supplement, D activated plant sterol, vitamin E supplement, calcium carbonate, dicalcium phosphate, iodized salt, ferric ammonium citrate, iron oxide, manganous oxide, cobalt carbonate, ccopper oxide, zinc oxide.

Treatments are randomly assigned to cages.

Each of the treatments are tested in three replicate groups, i.e., in three cages of ten mice each. There are ten cages of ten untreated control mice each. The phenylethane derivatives and the growth hormones are administered by daily injection or mixed in the diet at the dosage level indicated. At the end of the 12-day test period, the mice are weighed as a group of ten and the weight gain determined. The mice are sacrificed by cervical dislocation. The right uterine fat pad of each mouse is removed. The fat pads for each cage of ten mice are weighed as a unit and relative fat pad to body weight ratios are obtained.

Data obtained from these tests are reported in Tables I, II and III below. Table I below summarizes the increases in weight gains obtained by providing 25 ppm to 200 ppm of the phenylethane compound 5-[hydroxy-2-(isopropylamino)ethyl]anthranilonitrile in the feed while treating with 200 micrograms/day to 800 micrograms/day of bovine growth hormone by injection.

TABLE I

Evaluation of the method of the invention for weight gain for varying levels of phenylethane compound and bovine growth hormone
% Change (±) from control (weight gain)

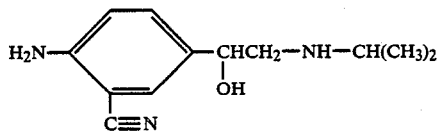

5-[1-Hydroxy-2-(isopropylamino)ethyl]anthranilonitrile

| | | Concentration in feed (ppm) | | | | |
|---|---|---|---|---|---|---|
| | | 0 | 25 | 50 | 100 | 200 |
| | 0 | — | 79.6 | 103.6 | −0.3 | 104.5 |
| bovine growth | 200 | 218.8 | 337.5 | 355.4 | 368.8 | 336.6 |
| hormone | 400 | 317.0 | 379.5 | 419.6 | 420.5 | 397.3 |
| micrograms/day | 800 | 378.6 | 398.2 | 467.9 | 444.6 | 434.8 |

Table II below summarizes the synergistic percentage increases in weight gains obtained by providing 50 ppm of various phenylethane compounds in the feed while treating with 200 micrograms/day of either bovine growth hormone or porcine growth hormone.

TABLE II

Synergistic increases in weight gains obtained by the method of the invention utilizing phenylethane compounds of formula I expressed as % increase in excess of the sum of the increases obtained by individual treatment

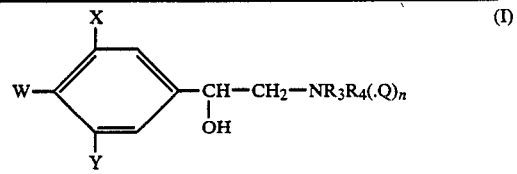

(I)

| W | X | Y | $R_3$ | $R_4$ | Q | pGH | bGH |
|---|---|---|---|---|---|---|---|
| $NH_2$ | F | H | H | $i$-$C_3H_7$ | — | 14.3 | 10.8 |
| $NH_2$ | F | Cl | H | $t$-$C_4H_9$ | — | 13.6 | 11.9 |
| $NH_2$ | Cl | Cl | H | $t$-$C_4H_9$ | — | 3.6 | 13.9 |
| $NH_2$ | Cl | $CF_3$ | H | $t$-$C_4H_9$ | — | 34.4 | 43.9 |
| $NH_2$ | H | CN | H | $i$-$C_3H_7$ | — | 11.8 | 25.9 |
| $NH_2$ | H | CN | $i$-$C_3H_7$ | $i$-$C_3H_7$ | HCl | 21.3 | 15.2 |
| H | F | CN | H | $i$-$C_3H_7$ | — | 18.4 | 5.0 |

Table III below summarizes the ratios of fat pad weight/body weight obtained by providing 50 ppm of various phenylethane compounds in the feed while treating with 200 micrograms/day of growth hormone.

TABLE III

Effect of Treatment with Growth Hormones and Phenylethane Compounds of Formula I on Relative Fat Pad Weights.
[(Fat Pad Wt/Body Wt.)]

(I)

| | | | | | | | DAILY INJECTION | |
|---|---|---|---|---|---|---|---|---|
| Phenylethane Compound | | | | | | | 200 µg | 200 µg |
| W | X | Y | $R_3$ | $R_4$ | Q | 0 | pGH | bGH |
| CONTROL - None | | | | | | .0087 | .0087 | .0084 |
| $NH_2$ | F | H | H | $i$-$C_3H_7$ | — | .0033 | .0040 | .0045 |
| $NH_2$ | F | Cl | H | $t$-$C_4H_9$ | — | .0069 | .0056 | .0060 |
| $NH_2$ | Cl | Cl | H | $t$-$C_4H_9$ | — | .0054 | .0057 | .0066 |
| $NH_2$ | Cl | $CF_3$ | H | $t$-$C_4H_9$ | — | .0071 | .0065 | .0070 |
| $NH_2$ | H | CN | H | $C_3H_7$ | — | .0046 | .0052 | .0056 |
| $NH_2$ | H | CN | $i$-$C_3H_7$ | $i$-$C_3H_7$ | HCl | .0076 | .0072 | .0072 |
| H | F | CN | H | $i$-$C_3H_9$ | — | .0057 | .0063 | .0065 |

EXAMPLE III

Evaluation of Test Compositions—Sheep Study

Eighty crossbred wether lambs are individually weighed and allotted to groups of 10 animals per pen to minimize weight variation among pens. The basal diet used in these studies is a sheep ration (see description below), which is supplied once daily at leavels at least 2 kg/pen higher than consumption. Water is allowed ad libitum.

The following is a description of the diet utilized in this study.

| Sheep Ration Diet | |
|---|---|
| | % |
| Ground Corn Cobs | 15.0 |
| Ground Yellow Corn | 48.0 |
| Soybean Meal (48%) | 10.0 |
| Dehydrated Alfalfa Meal (17%) | 15.0 |
| Black Strap Molasses | 10.0 |
| Iodized Salt | 0.5 |
| DiCalcium Phosphate | 1.0 |
| Mineral-Vitamin Mix | 0.5 |
| | 100.0 |

The lambs are implanted with 2 implants of the phenylethane compound 5-[1-hydroxy-2-(isopropylamino)-ethyl]anthranilonitrile, which each release the compound at a rate of about 1.5 mg/lamb/day; or lamb control implants of similar size as indicated in Table IV below. The lambs are injected daily with either boving growth hormone (0.15 mg/kg/day) or a blank control injection of the carrier solution as indicated in Table IV below.

TABLE IV

| | Untreated[1] Control | bGH[1] mg/ kg/day | Implanted[1] Phenylethane Compound mg/kg/day | bGH[1] Phenylethane Compound mg/ kg/day |
|---|---|---|---|---|
| b Growth Hormone | 0 | 0.15 | 0 | 0.15 |
| 5-[1-hydroxy-2-(isopropylamino)-ethyl]anthranilonitrile | 0 | 0 | 0.09 | 0.09 |

[1]Replicated treatments, 2 pens of 10 animals/treatment.

Following a six week treatment period the average daily weight gain per animal in grams is determined. These lambs are sacrificed for carcass evaluation which includes standard quality measurement as well as measures of both carcass fat and muscle characteristics. The results of these experiments which are summarized in Table V below demonstrate the effectiveness of the method of this invention utilizing combination treatments to increase weight gains and reduce body fat in excess of the sum of the effects attributable to each treatment.

TABLE V

Effect of Individual Treatments And Combination Treatment Versus Untreated Control

|  | Untreated Control | bGH | Phenylethane Compound | bGH & Phenylethane Compound |
| --- | --- | --- | --- | --- |
| Average Daily Weight Gain (g) | 260 | 315 | 262 | 336 |
| 12th rib fat dept (mm) | 2.26 | 1.88 | 2.17 | 1.45 |
| Kidney fat % | 1.71 | 1.92 | 1.63 | 1.59 |
| Loin eye area (cm$^2$) | 14.6 | 14.7 | 15.9 | 17.0 |
| Semitendinosus muscle weight (g) | 98.6 | 96.8 | 105.0 | 117.2 |

What is claimed is:

1. A method for increasing weight gain of warm-blooded animals and improving lean meat to fat ratio of the animals comprising parenterally administering a growth promoting growth hormone and concurrently administering a feed additive or a parenteral composition containing a growth promoting amount of a phenylethane derivative compound selected from the group consisting of 4-amino-3-fluoro-α-[(isopropylamino)-methyl]benzyl alcohol, 4-amino-α-[(tert-butylamino) methyl]-3-chloro-5-fluorobenzyl alcohol, 4-amino-α-[(tert-butylamino) methyl]-3,5-dichlorobenzyl alcohol, 4-amino-α-[tert-butylamino) methyl]-3-chloro-5-(trifluoromethyl) benzyl alcohol, 5-[1-hydroxy-2-(isopropylamino)ethyl]-anthranilonitrile, 5-[2(diisopropylamine)-1-hydroxyethyl]-anthranilonitrile hydrochloride, 3-[2-tert-butylamino)-1-hydroxyethyl]-5-fluorobenzonitrile, and pharmaceutically acceptable acid addition salts thereof.

2. A method according to claim 1 wherein 0.01 mg/kg/day to 50 mg/kg/day of a growth hormone is administered parenterally in conjunction with administration of 0.000001% to 0.02%, (0.01 ppm–200 ppm), by weight of phenylethane derivative compound parenterally or in the animal's feed.

3. A method according to claim 2 wherein the growth hormone is bovine growth hormone at a rate of from 0.05 mg/kg/day to 10 mg/kg/day or porcine growth hormone at a rate of from 0.015 mg/kg/day to 10 mg/kg/day.

4. A method according to claim 3, wherein 0.1 ppm to 10 ppm of 5-[1-hydroxy-2-(isopropylamino)ethyl]anthranilonitrile is concurrently administered with bovine growth hormone.

* * * * *